(12) United States Patent
Braun

(10) Patent No.: US 7,088,526 B2
(45) Date of Patent: Aug. 8, 2006

(54) LENS COLLIMATOR AND METHOD OF PRODUCING OPTICAL SIGNALS WITH REDUCED ABERRATIONS

(75) Inventor: Leroy O. Braun, Ashburn, VA (US)

(73) Assignee: ITT Manufactruing Enterprises, Inc., Wilmington, DE (US)

(*) Notice: Subject to any disclaimer, the term of this patent is extended or adjusted under 35 U.S.C. 154(b) by 12 days.

(21) Appl. No.: 10/635,448

(22) Filed: Aug. 7, 2003

(65) Prior Publication Data

US 2005/0030646 A1    Feb. 10, 2005

(51) Int. Cl.
*G02B 17/00* (2006.01)
(52) U.S. Cl. ............... 359/732; 359/627; 359/727; 359/730; 359/731
(58) Field of Classification Search ............... 359/627, 359/641, 726, 503, 727, 362, 364, 729, 730–732, 359/737, 738, 796, 850
See application file for complete search history.

(56) References Cited

U.S. PATENT DOCUMENTS

| | | | |
|---|---|---|---|
| 2,378,301 A * | 6/1945 | Kaprelian | 359/731 |
| 3,700,310 A | 10/1972 | Rayces | |
| 4,121,890 A | 10/1978 | Braun | |
| 4,167,328 A | 9/1979 | Cross et al. | |
| 4,526,467 A | 7/1985 | Fantone | |
| 4,674,011 A | 6/1987 | Patton et al. | |
| 4,943,157 A | 7/1990 | Reding | |
| 5,071,216 A | 12/1991 | Sullivan | |
| 5,155,631 A | 10/1992 | Snyder et al. | |
| 5,644,436 A * | 7/1997 | Togino et al. | 359/731 |
| 5,715,023 A * | 2/1998 | Hoppe | 349/11 |
| 5,864,436 A | 1/1999 | Noyes | |
| 5,999,672 A | 12/1999 | Hunter et al. | |
| 6,064,641 A | 5/2000 | Braat | |
| 6,169,637 B1 * | 1/2001 | Tsunashima | 359/726 |

(Continued)

FOREIGN PATENT DOCUMENTS

DE      2 249 654      4/1974

OTHER PUBLICATIONS

Honmou et al., "1.0 dB Low-Loss Coupling Of Laser To Single-Mode Fibre Using A Planoconvex Graded-Index Rod Lens", *Electronics Letters*, vol. 22, No. 21, pp. 1122-1123, Oct. 9, 1986.

(Continued)

*Primary Examiner*—Hung Xuan Dang
*Assistant Examiner*—Joseph Martinez
(74) *Attorney, Agent, or Firm*—Edell, Shapiro & Finnan, LLC

(57) ABSTRACT

A lens collimator according to the present invention includes a plurality of lens elements bonded together. The lens elements, preferably three, each include spherical surfaces and are generally concentrically disposed relative to each other. The lens elements are arranged to produce an increased quantity of reflections and refractions within a lens optical path. The reflections and refractions reduce aberrations and control signal intercept angles relative to an image plane, thereby enabling the lens to match the performance of an optical signal carrier utilized with the lens. The lens element arrangement basically serves to provide an optical path with a quantity of reflections similar to that achieved with a lens having a greater quantity of elements or surfaces. The reflections and refractions enable the lens to cancel out or remove undesired characteristics (e.g., aberrations, etc.) from the resulting optical signals.

23 Claims, 9 Drawing Sheets

U.S. PATENT DOCUMENTS

| | | |
|---|---|---|
| 6,192,022 B1 | 2/2001 | Hendriks et al. |
| 6,271,970 B1 | 8/2001 | Wade |
| 6,289,155 B1 | 9/2001 | Wade |
| 6,859,334 B1 * | 2/2005 | Kuiseko et al. ............. 359/727 |
| 2002/0064191 A1 | 5/2002 | Capewell |

OTHER PUBLICATIONS

Karstensen, H., "Laser diode to single-mode fiber coupling with ball lenses", *Journal of Optical Communications*, vol. 9, No. 2, pp. 42-49, Jun. 1988.

Karstensen et al., "High-Efficiency Two Lens Laser Diode to Single-Mode Fiber Coupler with a Silicon Plano Convex Lens", *Journal of Lightwave Technology*, vol. 7, No. 2, pp. 244-249, Feb. 1989.

Karstensen, et al, "Loss Analyis of Laser Diode to Single-Mode Fiber Couplers with Glass Spheres or Silicon Plano-Convex Lenses", Journal of Lightwave Technology, vol. 8, No. 5, pp. 739-747, May 1990.

Liu et al., "Efficiency and optical feedback of traveling-wave semiconductor laser amplifier to single-mode fiber coupling: theory and experiment", *Fiber & Integrated Optics*, vol. 12, No. 1, pp. 47-55, 1993.

Meillleur et al., "High power 1.48 mu m laser pump module using efficient and low feedback microlenses", *Proceedings of the 11th Annual Conference on European Fibre Optic Communications and Networks*, pp. 205-209, 1993.

* cited by examiner

| Surface # | Surface Name | Surface Type | Y Radius | Thickness | Glass | Refract Mode | Y Full Aperture |
|---|---|---|---|---|---|---|---|
| Object | | sphere | Infinity | Infinity | | Refract | 0 |
| 1 | | sphere | Infinity | 1.00000000 | | Refract | 6.00000000 |
| Stop | | sphere | Infinity | 1.15000000 | | Refract | 6.00000000 |
| 3 | | sphere | -7.19432779 v | 1.20000000 | BK7_SCH | Refract | 6.00000000 |
| 4 | | sphere | -10.00000000 | 1.20000000 | SFL57_s | Refract | 6.00000000 |
| 5 | | sphere | -7.19432779 P | -1.20000000 | SFL57_s | Reflect | 6.00000000 |
| 6 | | sphere | -12.21347560 v | -0.60000000 P | BK7_SCH | Refract | 4.20000000 |
| 7 | | sphere | -8.48671663 v | -0.45532616 v | SF5_SCH | Refract | 4.20000000 |
| 8 | | sphere | -12.21347560 P | 0.45532616 P | SF5_SCH | Reflect | 6.00000000 |
| 9 | | sphere | -7.19432779 P | 0.60000000 P | BK7_SCH | Refract | 6.00000000 |
| 10 | | sphere | -10.00000000 P | 1.20000000 P | SFL57_s | Refract | 6.00000000 |
| 11 | | sphere | -7.19432779 P | -1.20000000 P | SFL57_s | Reflect | 6.00000000 |
| 12 | | sphere | -12.21347560 P | -0.60000000 P | BK7_SCH | Refract | 4.20000000 |
| 13 | | sphere | -8.48671663 P | -0.45532616 P | SF5_SCH | Refract | 4.20000000 |
| 14 | | sphere | -12.21347560 P | 0.45532616 P | SF5_SCH | Reflect | 6.00000000 |
| 15 | | sphere | -7.19432779 P | 0.60000000 P | BK7_SCH | Refract | 6.00000000 |
| 16 | | sphere | -10.00000000 P | 1.20000000 P | SFL57_s | Refract | 6.00000000 |
| 17 | | sphere | -10.00000000 | 0.10000000 | | Refract | 6.00000000 |
| Image | | sphere | Infinity | 0.00000000 | | Refract | 6.00000000 |
| | | | | End Of Data | | | |

FIG.5

LENS COLLIMATOR AND METHOD OF PRODUCING OPTICAL SIGNALS WITH REDUCED ABERRATIONS

STATEMENT REGARDING FEDERALLY SPONSORED RESEARCH OR DEVELOPMENT

The invention was made with Government support and the Government may have certain rights in the invention.

BACKGROUND OF THE INVENTION

1. Technical Field

The present invention pertains to lenses. In particular, the present invention pertains to a lens collimator, preferably for optical communication systems, that provides optical signals with reduced aberrations. The lens collimator includes a plurality of lens elements that provide an increased quantity of surfaces for optical signal reflections and refractions to occur within the lens optical path, thereby enabling the lens collimator to cancel out adverse effects (e.g., aberrations, etc.) from the resulting optical signals or beam.

2. Discussion of Related Art

Optical communication systems employ optical or light signals to transfer information between system sites. Interconnection between local system sites may employ media, such as fiber optic cables, to transport the optical signals. With respect to remote system sites, the optical signals may be transmitted in the surrounding environment between transmitting and receiving units. These units typically employ lenses to produce the optical signals in a desired format. For example, a transmitting unit lens typically receives narrow or focused optical signals from a carrier (e.g., fiber optic cable, etc.) and produces collimated or parallel optical signals for transmission. Conversely, a receiving unit lens receives the collimated or parallel optical signals and focuses the signals onto a narrow carrier (e.g., fiber optic cable, etc.) for subsequent processing.

Lenses with spherical surfaces are typically employed by the transmitting and receiving units to produce the desired optical signals. However, these types of lenses produce aberrations that degrade the produced optical signals. The aberrations vary depending upon the dimensions and materials of the lens. In order to reduce aberrations, lenses are designed to reflect and refract the optical signals in a manner that cancels out the undesirable effects. Generally, the greater the quantity of surfaces within and different materials of the lens the better the lens performance that can be achieved.

Conventional lens designs generally implement a linear optical path. However, some may employ a folded optical path, where the quantity of folds is limited. For example, U.S. Pat. No. 4,121,890 (Braun) discloses a laser rangefinder tester. A thick lens or prism with at least one spherical shaped surface is utilized in conjunction with a glass fiber delay line to create a sensitivity, boresight and range accuracy test unit for a laser rangefinder. A light ray is reflected within the prism and is gradually focused to a focal point due to a curved reflective surface. The prism is designed to provide a minimum beam diameter at the focal point which is located just outside the prism, where the beam is injected into an input end of an optical fiber or waveguide of a delay unit. The delay unit produces a simulated range return pulse for the rangefinder that travels through the prism as described above.

The above lenses suffer from several disadvantages. Although the above types of lenses are generally easier to fabricate and less expensive, the dimensions and weight of these lenses are usually significant. Since optical systems are typically employed with other components and/or in areas of limited space (e.g., a turret on planes and/or helicopters, etc.), the dimensions and weight of the lens becomes important. This is especially pertinent since these lens characteristics have a ripple type effect on the size and weight of system components housing the lens. Further, the reduced quantity of folds or reflections and refractions in a lens optical path has a deleterious effect on aberrations, thereby producing a degraded beam or requiring additional components to compensate for the adverse effects. Generally, a greater quantity of reflections and refractions within a lens optical path reduces aberrations. Enhancing the quality of reflections in a single element lens significantly increases fabrication and associated costs. For example, diamond turning is likely to be employed, where the single element lens requires multiple aspheric curvatures on different portions of each surface. Post-turning polishing in these circumstances is extremely difficult and tends to adversely affect the surface accuracy.

The present invention lens collimator includes additional elements and surfaces to provide an enhanced quantity of reflections and refractions within the lens optical path in order to significantly cancel out the spherical aberrations. This permits surface curvatures and lens element glass types to be optimized to reduce total lens spherical aberration while minimizing the size of the central obscuration.

OBJECTS AND SUMMARY OF THE INVENTION

Accordingly, it is an object of the present invention to construct a lens that is small (e.g., compact, low volume, etc.), light weight and sturdy and that may be utilized for several purposes simultaneously.

It is another object of the present invention to construct a lens of a plurality of elements arranged to produce an enhanced quantity of reflections and refractions within a lens optical path in order to reduce aberrations.

Yet another object of the present invention is to form a lens of a bonded assembly with a carrier medium attached to the lens at a focal plane adjacent one of the lens elements, thereby enabling the lens to maintain alignment and either be in an operational state or a disabled state (e.g., in other words, preventing the lens from operating in an impaired state).

Still another object of the present invention is to form a lens that is substantially temperature insensitive.

A further object of the present invention is to construct a lens that enables optical signals to be widely spaced in order to provide increased area for additional optical components.

The aforesaid objects may be achieved individually and/or in combination, and it is not intended that the present invention be construed as requiring two or more of the objects to be combined unless expressly required by the claims attached hereto.

According to the present invention, a lens collimator includes a plurality of lens elements bonded together. The lens elements, preferably three, each include spherical surfaces and are generally concentrically disposed relative to each other. The lens elements are arranged to produce an increased quantity of reflections and refractions within a lens optical path. The reflections and refractions reduce aberrations and control signal intercept angles relative to an image plane, thereby enabling the lens to match the performance of an optical signal carrier utilized with the lens. The lens element arrangement basically serves to provide an optical path with a quantity of reflections and refractions similar to that achieved with a lens having a greater quantity of elements or surfaces. The reflections and refractions enable the lens to cancel out or remove undesired characteristics (e.g., aberrations, etc.) from the resulting optical signals.

The present invention provides several advantages. In particular, the reflections provide a folded or tortuous optical path, thereby enabling the lens to be small (e.g., small volume and size) and lightweight. The lens includes a bonded assembly with a focal plane at or near a lens element surface. A carrier (e.g., fiber, etc.) utilized with the lens is typically attached to the lens at the focal plane, where the combination provides a rugged assembly that maintains alignment and is substantially insensitive to vibration and shock. Thus, the lens enters either an operational state or a disabled state and thereby does not function in an impaired or broken state. Further, the lens is substantially temperature insensitive, especially when the propagation length in air is minimal and/or the image is at the lens surface. This is due to the lens being in the form of a single unit with elements constructed of similar materials. Basically, the lens expands from heat and moves the focal plane relative to the lens. However, the carrier attached to the lens within the focal plane similarly expands, thereby maintaining the lens in focus. Moreover, the f-number (e.g., focal length/diameter) of the lens enables optical signals to be spaced widely upon entry and exit, thereby providing extra space for additional optics.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 5 is an illustration of a table indicating a lens prescription for the lens collimator of the present invention.

DETAILED DESCRIPTION OF THE PREFERRED EMBODIMENTS

Figure 1:
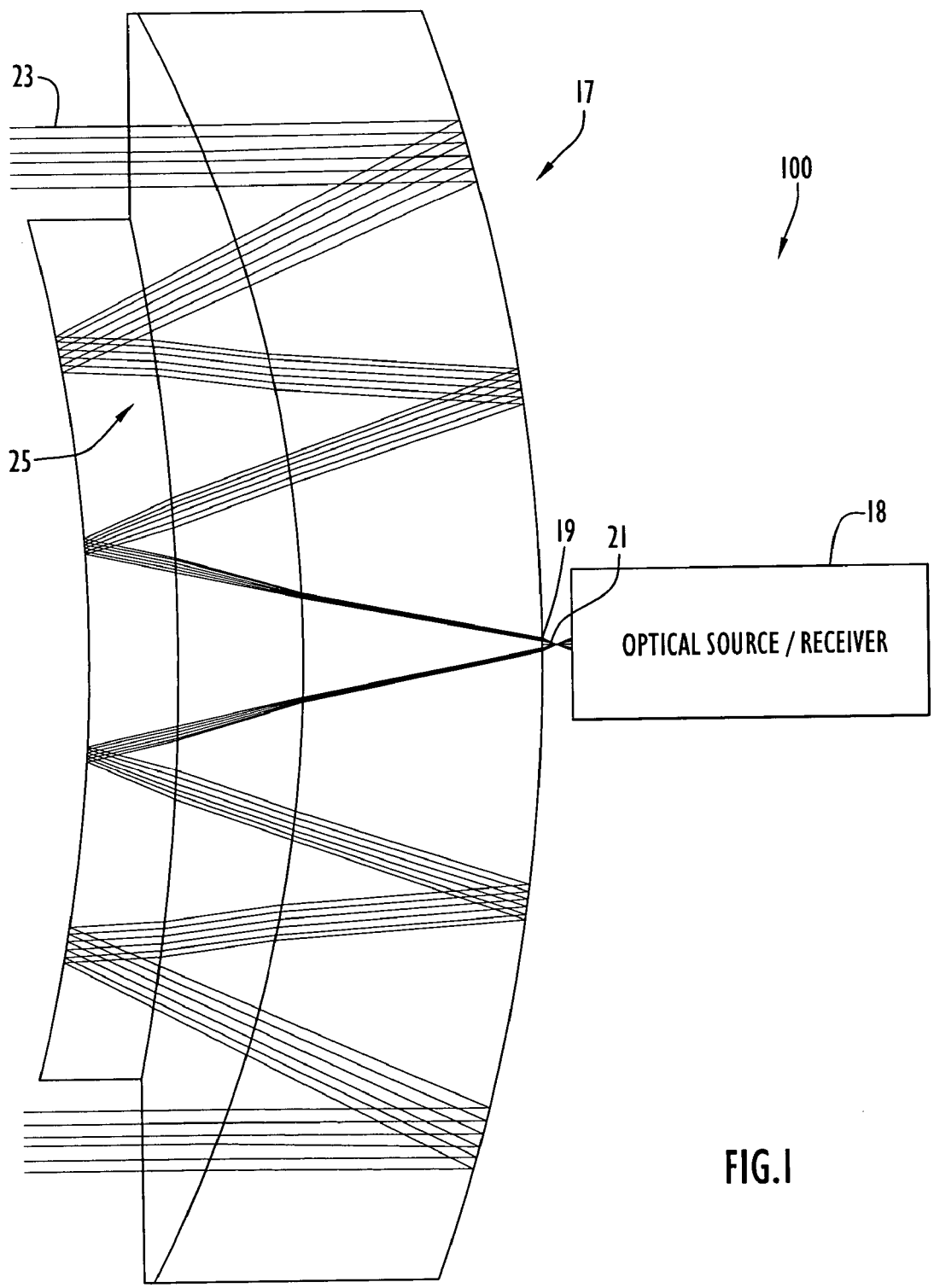
FIG. 1 is a side view in perspective of an exemplary optical communications unit employing a lens collimator of the present invention.

An exemplary optical communications unit employing a lens collimator of the present invention is illustrated in FIG. 1. Initially, optical communications unit 100 may be utilized in an optical communications system to optically transfer (e.g., transmit and/or receive) information between communication system sites. Specifically, unit 100 includes a lens collimator 17, an optical signal device 18 and an optical signal carrier 21. Lens 17 is typically mounted in a holder (not shown), while this type of application may further include additional optics (not shown). Unit 100 may be in the form of an optical transmitting or receiving unit, where device 18 may be a laser transmitter or an optical receiver to process incoming optical signals, respectively. Alternatively, the unit may be in the form of a transceiver, where device 18 transmits and receives optical signals.

Device 18 is coupled to lens 17 via optical signal carrier 21, preferably in the form of communications grade optical fiber. The optical signal carrier is positioned toward a lens focus point. In a unit transmitting mode, optical signals from optical device 18 are received by the lens via optical carrier 21. The optical signals enter the lens as a narrow beam 19 and propogate through the lens in a folded or tortuous optical path 25. The lens produces a parallel or collimated beam 23 that is directed toward an optical communications receiving unit.

Lens 17 may further serve as a pointing sensor to aim the optical beam. In particular, unit 100 may further include an additional lens serving as a wide field of view sensor to inform associated circuitry the direction of a received beam. A unit pointing mechanism aims the lens collimator to enable optical signals or light received by the lens to be focused near optical carrier 21. The light basically enters the lens collimator in the form of parallel beams 23 and propagates through the lens along folded optical path 25 to produce resulting narrow beam 19. Since the optical carrier precludes placement of a sensor at the lens focal point, light that misses the optical carrier is re-imaged to another focal plane containing a position sensor that provides information to adjust the pointing mechanism. Thus, the position sensor and lens form a fine tracking assembly.

In addition, lens 17 may receive incoming optical signals in a unit receiving mode. In this case, optical signals or light enter lens 17 as parallel beams 23 and are focused by lens optical path 25 onto optical carrier 21 as described above. Device 18 receives the optical signals from optical carrier 21 for subsequent processing.

Figure 2:
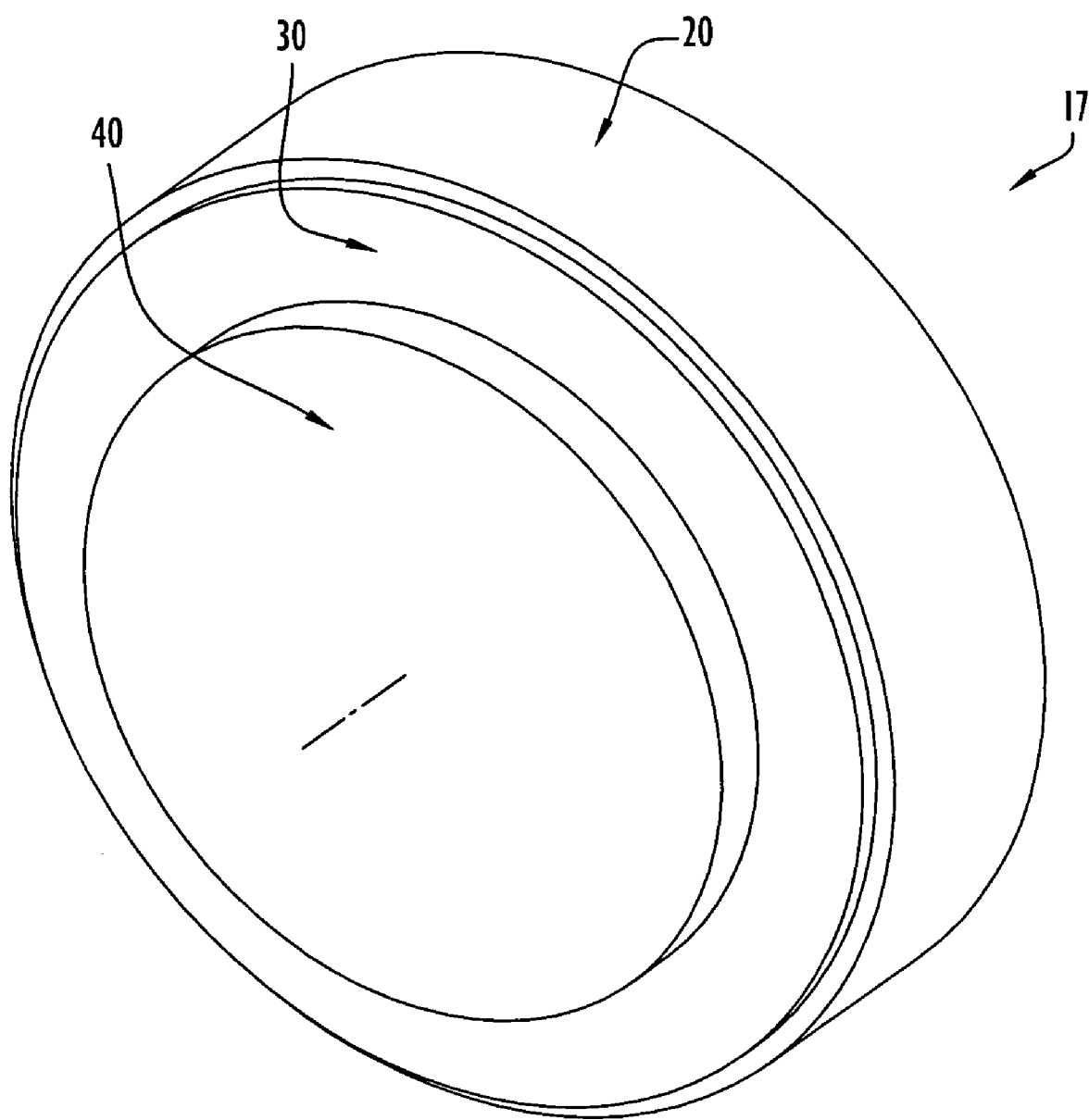
FIG. 2 is a view in perspective of the lens collimator of FIG. 1 according to the present invention.
Figure 3:
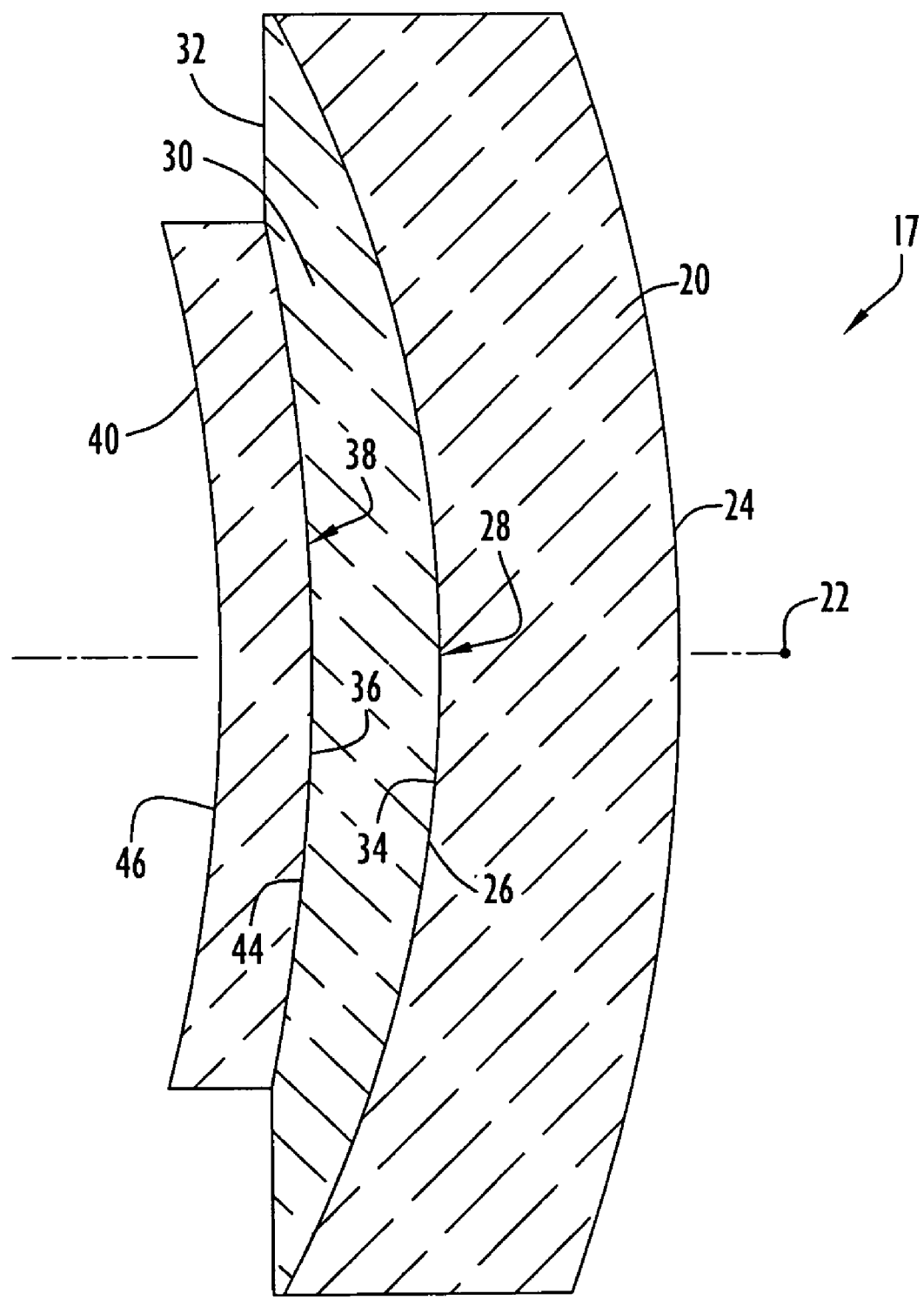
FIG. 3 is a side view in section of the lens collimator of FIG. 2.

Lens collimator 17 according to the present invention is illustrated in FIGS. 2–3. Specifically, lens collimator 17 includes a focal lens element 20, a stop lens element 30 and a reflective and refractive lens element 40. The lens elements may each be implemented by a conventional lens including spherical surfaces and a common industry coating. By way of example only, the coating may include pure evaporated gold with an overcoat (e.g., magnesium dioxide, etc.) for mechanical protection. Alternatively, a dielectric multi-layer coating (e.g., including approximately twenty to thirty layers of various oxides) may be employed for enhanced durability.

The lens elements are bonded together in a concentric fashion via conventional optical cement. This may be accomplished via a laboratory arrangement to center the lens elements relative to each other. The adhesive or cement is clear or transparent and has essentially no effect on the properties of lens 17. This type of material is typically utilized with a majority of quality camera lenses. By way of example only, the cement may be implemented by a Norland type sixty-one or sixty-five adhesive. Lens 17, by way of example only, includes a diameter of approximately six inches and a thickness of approximately 2.5 inches. The lens includes a large clear aperture and effective aperture relative to its length and is near diffraction limited. In other words, the lens is designed to substantially reduce significant aberrations as described below. The lens focal length is approximately 6.8955 inches, thereby providing an f-number (e.g., focal length/diameter) of approximately 1.15.

Focal lens element 20 includes a lens external surface 24 that is positioned toward or contains a focal plane 22 of lens 17 and receives or produces a narrow beam or optical signals 19 (FIG. 1). The focal lens element is preferably implemented by a spherical type lens basically in the form of a substantially circular disk with a slightly curved or arced configuration. In particular, the focal lens element includes inwardly concave and outwardly convex external surface 24 and an opposing external surface 26. Surface 26 is inwardly convex and outwardly concave to form the lens element configuration. The focal lens element, by way of example only, includes a diameter of approximately six inches and curvature and thickness characteristics as indicated in the table of FIG. 5 described below. In addition, focal element 20 is preferably constructed of an SFL57 type glass available from SCHOTT Glas of Germany.

Stop lens element 30 is preferably implemented by a spherical type lens basically in the form of a substantially circular disk with a curved or arced configuration. Stop element 30 includes a flat rim 32 disposed adjacent the lens element periphery. The rim includes an anti-reflection coating to reduce reflections of an outgoing transmitted beam back into the lens. The coating typically includes a plurality of oxide layers, preferably three, in stacked arrangement. The stop lens element includes an inwardly concave and outwardly convex external surface 34 and an opposing external surface 36. Surface 36 is inwardly convex and outwardly concave to form the lens element configuration. The stop lens element, by way of example only, includes a diameter of approximately six inches and curvature and thickness characteristics as indicated in the table of FIG. 5 described below. Further, the stop element is preferably constructed of a BK7 type glass available from SCHOTT Glas of Germany. Stop lens element 30 is substantially centered on focal lens element 20, where surface 34 of stop element 30 is bonded to surface 26 of focal element 20 and the peripheral edges of lens elements 20, 30 are substantially flush. Bonded element surfaces 26, 34 form an element interface or junction 28, where optical signals traverse the different lens elements as described below.

Reflective lens element 40 is preferably implemented by a spherical type lens basically in the form of a substantially circular disk with a curved or arced configuration. The reflective lens element includes an inwardly concave and outwardly convex external surface 44 and an opposing external surface 46. Surface 46 is inwardly convex and outwardly concave to form the lens element configuration. The reflective lens element, by way of example only, includes a diameter of approximately 4.2 inches and curvature and thickness characteristics as indicated in the table of FIG. 5 described below. Further, the reflective element is preferably constructed of an SF5 type glass available from SCHOTT Glas of Germany. Reflective lens element 40 is substantially centered on stop lens element 30, where surface 44 of element 40 is bonded to surface 36 of element 30. Bonded element surfaces 36, 44 form an element interface or junction 38, where optical signals traverse the different lens elements as described below.

Figure 4:
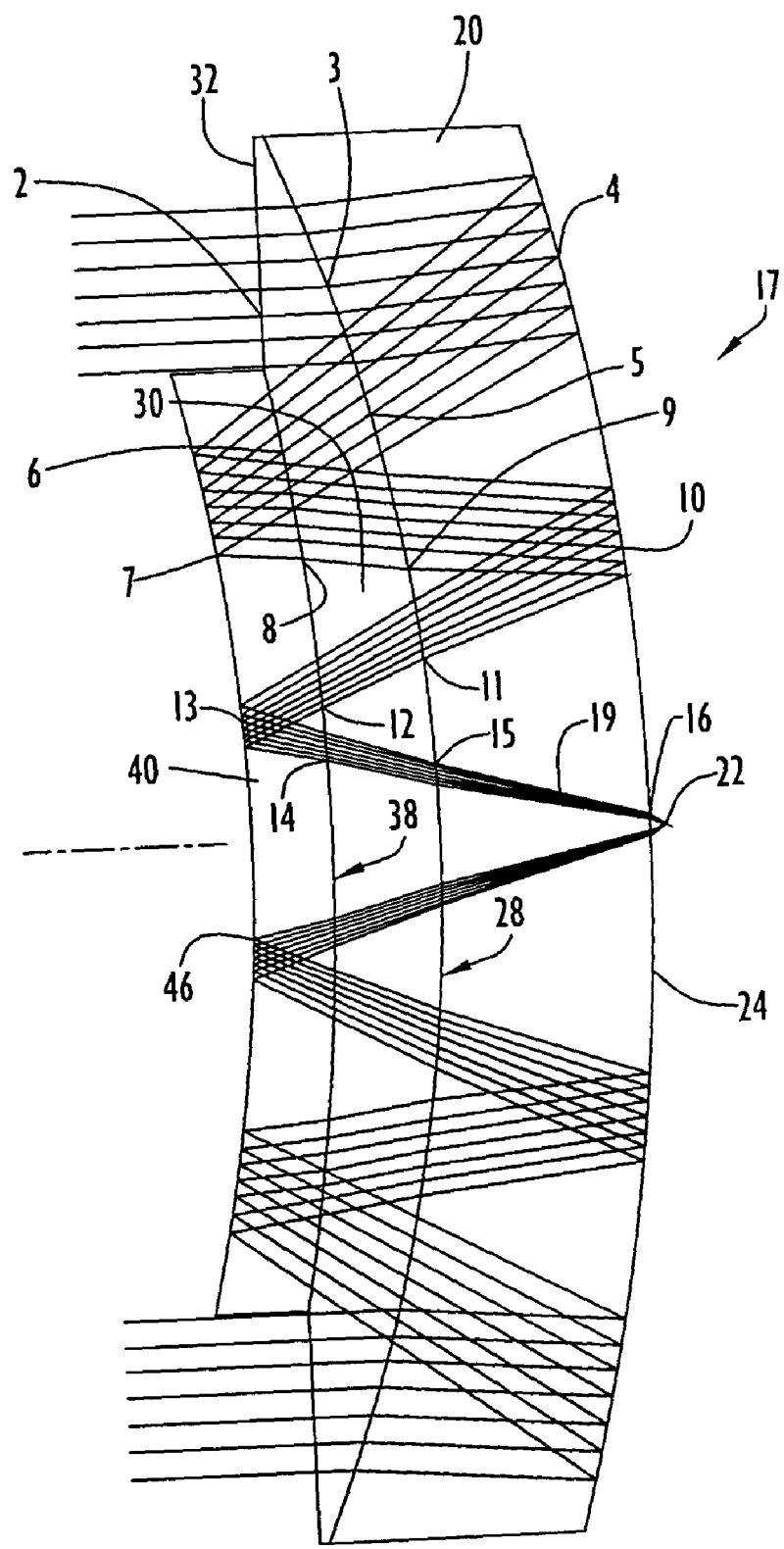
FIG. 4 is a side view in perspective of the lens collimator of FIG. 2 diagramatically illustrating an optical signal path through the lens according to the present invention.

The manner in which optical signals traverse lens collimator 17 according to the present invention is illustrated in FIGS. 4–5. Initially, lenses with spherical surfaces produce aberrations depending upon the radii and materials of the lenses. In order to provide enhanced optical signals, lens 17 is designed to cancel out these adverse effects. Generally, the complexity of the lens design task may be reduced by employing a greater quantity of surfaces and different lens materials. Accordingly, lens 17 includes lens elements 20, 30, 40 as described above, where the arrangement of the lens elements produces several reflections and refractions within the lens optical path, thereby enabling the lens to function as though the lens includes a greater quantity of lens elements. The reflections and refractions are further distributed along the optical path (e.g., between the entering and exiting lens surfaces 24, 36) to smooth the cancellation process. A portion of the reflections and refractions within the lens optical path are dependent upon other path reflections and refractions since lens 17 includes a limited quantity of lens elements. However, the lens performance is significantly enhanced relative to a lens with the same quantity of elements.

Lens collimator 17 employs principles similar to those of a Maksutov Cassegrain telescope, a Schmitt Cassegrain telescope and the collimator disclosed in the aforementioned U.S. Patent (U.S. Pat. No. 4,121,890), but includes further elements to provide an optical path through lens 17 with additional reflections and refractions. The additional reflections and refractions reduce aberrations to enhance lens performance and control ray or beam intercept angles at the image plane. The intercept angles enable the lens to match the performance of optical fiber or other optical signal carrier employed with the lens.

Referring to FIG. 5, the illustrated table is commonly referred to as a lens prescription and describes lens 17 and the corresponding optical path through that lens. The surface indications in the table correspond to optical path locations (or lens element surfaces), where the optical signal or light ray or beam propagates from one lens element to another. In addition, the lens prescription includes "dummy" surfaces that correspond to a position or placeholder. These are typically added for the convenience of a designer, or to control a computer design system to function in a certain manner.

Optical or light rays or beam 23 enter lens 17 at a path surface 2 corresponding to the surface of rim 32 of stop lens element 30. This entry point enables the lens to function in accordance with the principles of the present invention. Path surface 2 is referred to as the "stop" in the table since this surface is the limiting aperture of the lens. The table columns provide information (e.g., Surface Number, Surface Type, Y Radius preferably indicated in inches (or curvature of the surface, where the curvature is equal to 1/Y Radius), Thickness of the lens element the beam is to enter preferably indicated in inches, Glass type of the lens element, Refract Mode (e.g., refract or reflect) of the lens element and Full Aperture or diameter of the lens element preferably indicated in inches) about each lens element and corresponding surface impacted by the beam. For example, the table indicates that path surface 2 is spherical and has a Y Radius of infinity (e.g., indicating that the path surface is flat), while stop element 30 has a thickness of 1.15 inches, is constructed of a BK7 type glass, refracts or permits the beam to pass through that surface and includes a diameter of approximately six inches. A negative Y Radius or curvature value indicates the path surface is convex toward focal plane 22. Thickness values are based on the direction of beam propagation. A positive thickness value indicates the beam is propagating toward focal plane 22, while a negative thickness value indicates the beam is propagating toward lens element surface 46. Path surface zero within the table indicates a light source at a significant distance uniformly illuminating the lens entry point, while path surface one is basically a "dummy surface" and does not correspond to a real surface.

Referring back to FIG. 4, path surface 2 receives the incoming optical signal or light beam and refracts or permits the beam to pass through that surface and stop element 30, where the beam subsequently encounters path surface 3 corresponding to interface 28 at the junction of rim 32 and focal element 20. The corresponding row in the table of FIG. 5 indicates the characteristics of this surface and focal lens element 20. The table further indicates the Y Radius of path surface 3 to be variable (e.g., by the "V" superscript as shown in FIG. 5), where a designer and/or computer system may adjust this value to optimize lens 17. Since lens 17 provides a quantity of reflections and refractions greater than the quantity of lens elements, the various information for a path surface may be fixed to or depend from another corresponding path surface. This circumstance is indicated in the table, preferably by a "P" superscript. For example, the table indicates that the Y Radius for path surface 5 is fixed to a corresponding value for a prior path surface (e.g., path surface 3).

The beam is refracted or passes through path surface 3 and focal lens element 20 to path surface 4 corresponding to surface 24 of the focal lens element. The corresponding row in the table of FIG. 5 indicates the characteristics for this surface and focal element 20. Path surface 4 reflects the beam back toward path surface 5 corresponding to interface 28 at the junction of focal lens element 20 and stop lens element 30. Path surface 5 is positioned radially inward of path surface 3 along interface 28, while the corresponding row in the table of FIG. 5 indicates the characteristics for this surface and stop element 30.

Path surface 5 refracts or permits the beam to pass through that surface and stop element 30 to path surface 6 corresponding to interface 38 at the junction of stop lens element 30 and reflective lens element 40. Path surface 6 is positioned radially inward of path surface 2 and refracts or permits the beam to pass through that surface and reflective element 40 toward path surface 7 corresponding to surface 46 of the reflective lens element. The corresponding rows in the table of FIG. 5 indicate the characteristics for path surfaces 6 and 7 and reflective lens element 40. The Y Radius and thickness of path surface 6 is variable, while the Y Radius of path surface 7 is variable. Thus, the curvature of path surfaces 3, 6 and 7 and the thickness of path surface 6 may be adjusted to optimize lens 17, while a majority of the remaining values are generally fixed to values for corresponding path surfaces.

The beam is reflected from path surface 7 back through reflective element 40 toward path surface 8 corresponding to interface 38 at the junction of the reflective element and stop element 30. The corresponding row in the table of FIG. 5 indicates the characteristics for this surface and stop element 30. Path surface 8 is positioned radially inward of path surface 6 along interface 38. The beam is refracted or permitted to pass through path surface 8 and stop element 30 to path surface 9 corresponding to interface 28 at the junction of the stop element and focal element 20. Path surface 9 is positioned radially inward of path surface 5 along interface 28 and refracts or permits the beam to pass though that surface and focal element 20 to path surface 10 corresponding to surface 24 of the focal lens element. The corresponding rows in the table of FIG. 5 indicate the characteristics for path surfaces 9 and 10 and focal lens element 20. Path surface 10 is positioned radially inward of path surface 4 along surface 24, where the beam is reflected from path surface 10 back through focal lens element 20 toward path surface 11 corresponding to interface 28 at the junction of the focal element and stop element 30. The corresponding row in the table of FIG. 5 indicates the characteristics for this surface and stop lens element 30. Path surface 11 is positioned radially inward of path surface 9 along interface 28. Path surface 11 refracts the beam or permits the beam to pass through that surface and stop element 30 toward path surface 12 corresponding to interface 38 at the junction of the stop element and reflective element 40. Path surface 12 is positioned radially inward of path surface 8 along interface 38 and refracts or permits the beam to pass though path surface 12 and reflective element 40 to path surface 13 corresponding to surface 46 of the reflective lens element. The corresponding rows in the table of FIG. 5 indicate the characteristics for path surfaces 12 and 13 and reflective lens element 40. Path surface 13 is positioned radially inward of path surface 7 along surface 46, where the beam is reflected from path surface 13 back through reflective element 40 toward surface 14 corresponding to interface 38 at the junction of the reflective element and stop element 30. The corresponding row in the table of FIG. 5 indicates the characteristics of this surface and stop lens element 30. Path surface 14 is positioned radially inward of path surface 12 along interface 38.

The beam is refracted or permitted to pass through path surface 14 and stop element 30 to path surface 15 corresponding to interface 28 at the junction of the stop element and focal element 20. The corresponding row in the table of FIG. 5 indicates the characteristics for this surface and focal lens element 20. Path surface 15 is positioned radially inward of path surface 11 along interface 28 and refracts or permits the beam to pass through path surface 15 and focal element 20 to path surface 16 corresponding to surface 24 of the focal lens element. The corresponding row in the table of FIG. 5 indicates the characteristics for this surface. Path surface 16 is positioned adjacent or at lens focal plane 22. At this point, the resulting beam is narrow with reduced aberrations and has performance matched to an optical signal carrier (e.g., optical fiber, etc.) disposed at the focal plane. Light may enter lens 17 at any other locations along rim 32 of stop element 30 and traverses an optical path substantially similar to the path described above. In addition, a narrow light beam may enter lens 17 at path surface 16, where the beam traverses the above-described optical path in reverse to produce a parallel or collimated beam for transmission from rim 32. Thus, the lens arrangement produces a folded or tortuous optical path through the lens with increased reflections and refractions resulting in a narrow or collimated beam with reduced aberrations.

Figure 6:
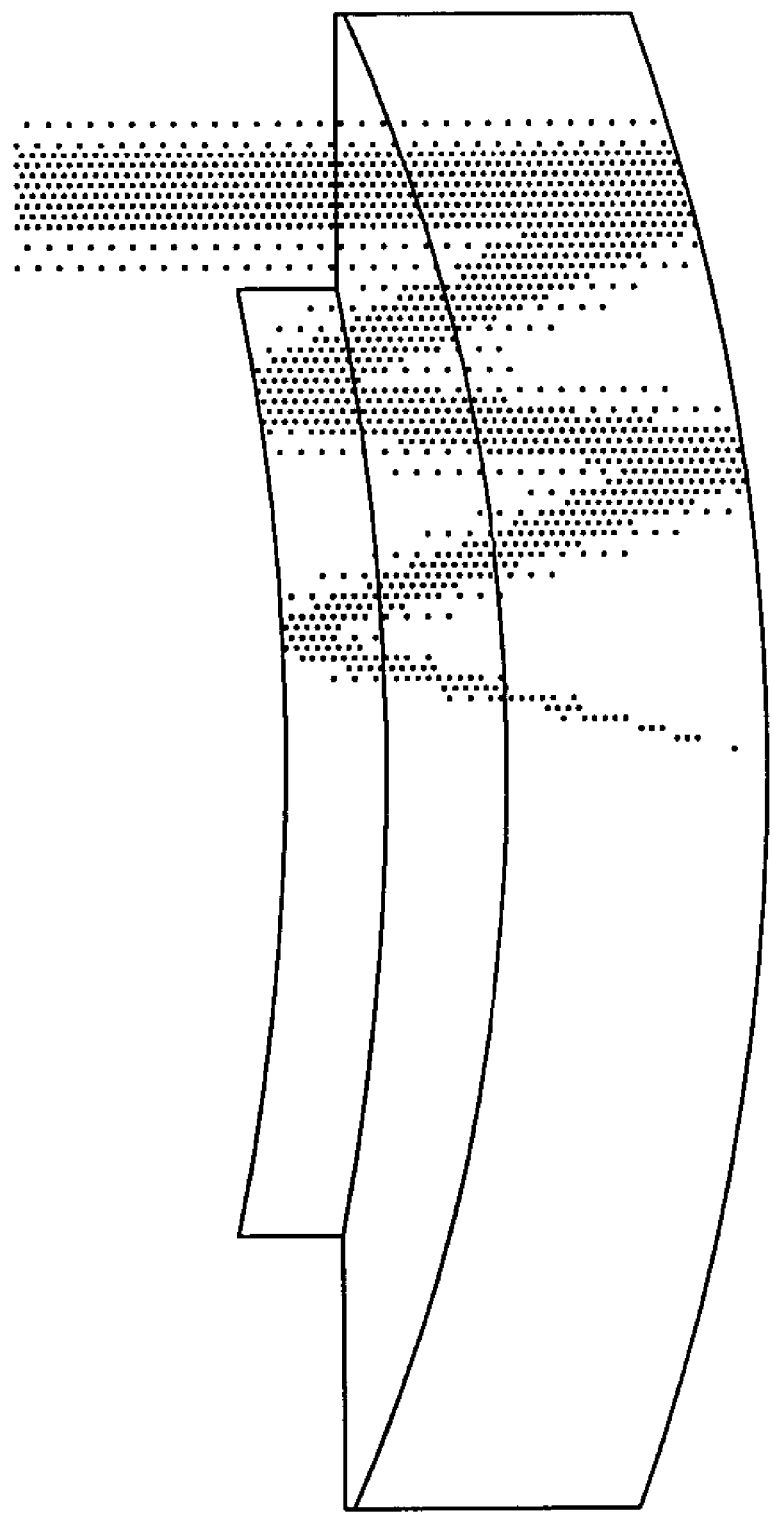
FIG. 6 is a graphical illustration of a Gaussian beam propagation through the lens collimator of the present invention.

For laser communication applications, the resulting beam from lens 17 should be focused to a spot with minimal dimensions. The lower the spot dimensions, the smaller the detector that processes the signal, which in turn, provides enhanced speed. In other words, the smaller the spot, the greater the data transmission possible. FIGS. 6–9 graphically illustrate various characteristics of lens 17. The graphs basically indicate that the resulting beam or spot produced by the lens collimator of the present invention is approximately one-thousandth of an inch in diameter. Thus, the lens provides enhanced performance considering the lens dimensions (e.g., approximately a six inch diameter and 2.5 inch thickness) and focal length (e.g., approximately six inches, thereby providing an f-number (diameter/focal length) of 1.0). In particular, FIG. 6 illustrates a Gaussian beam propogation through lens 17. This figure basically illustrates with diffraction effects light from an optical fiber expanding and being collimated as the light propagates through the lens.

Figure 7:
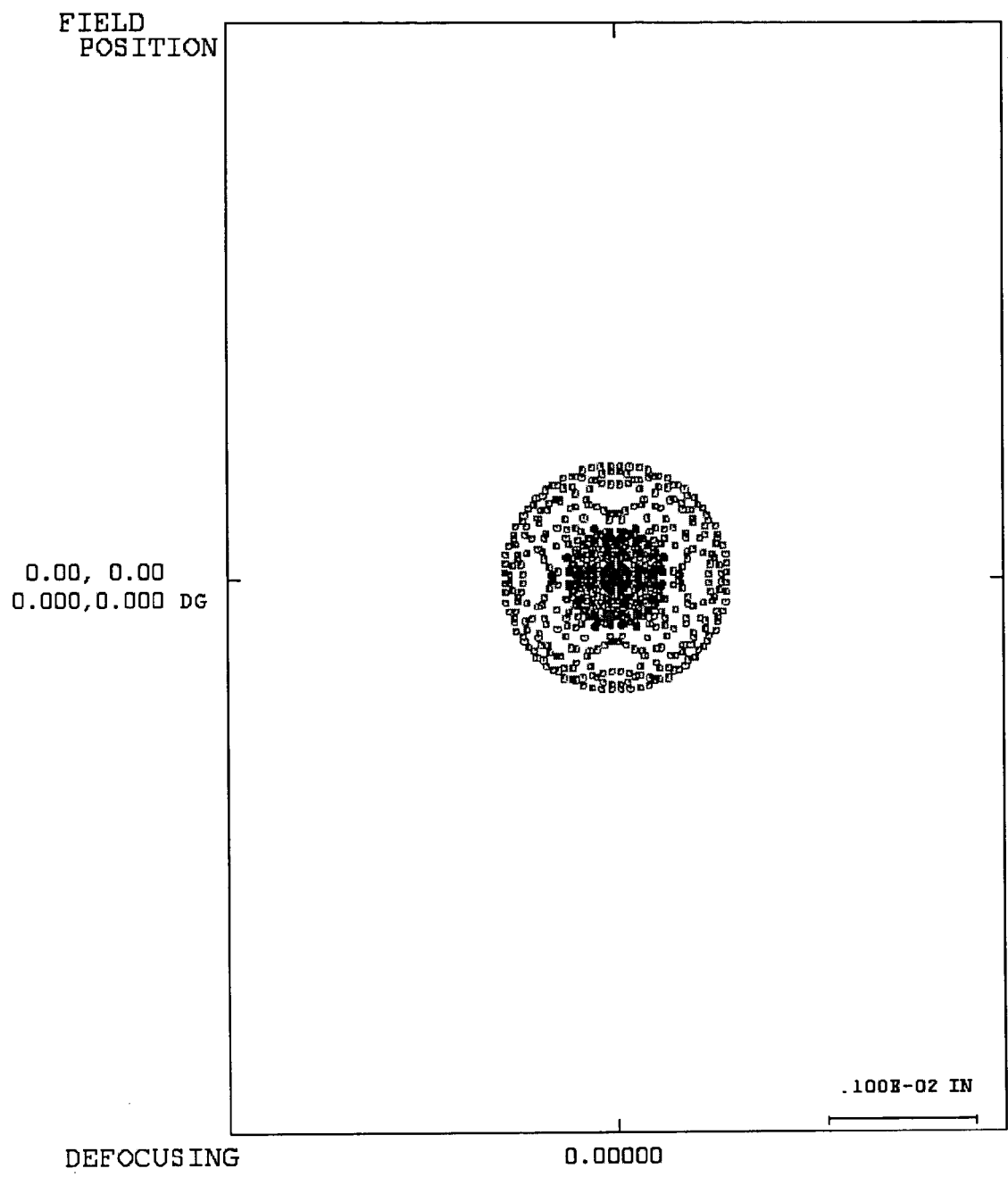
FIG. 7 is a graphical illustration of a geometric spot diagram of the lens collimator of the present invention.

FIG. 7 illustrates a geometric spot diagram. This diagram is the result of projecting numerous rays into the input aperture of the lens. The diagram illustrates where each ray intercepts the lens focal plane.

Figure 8:
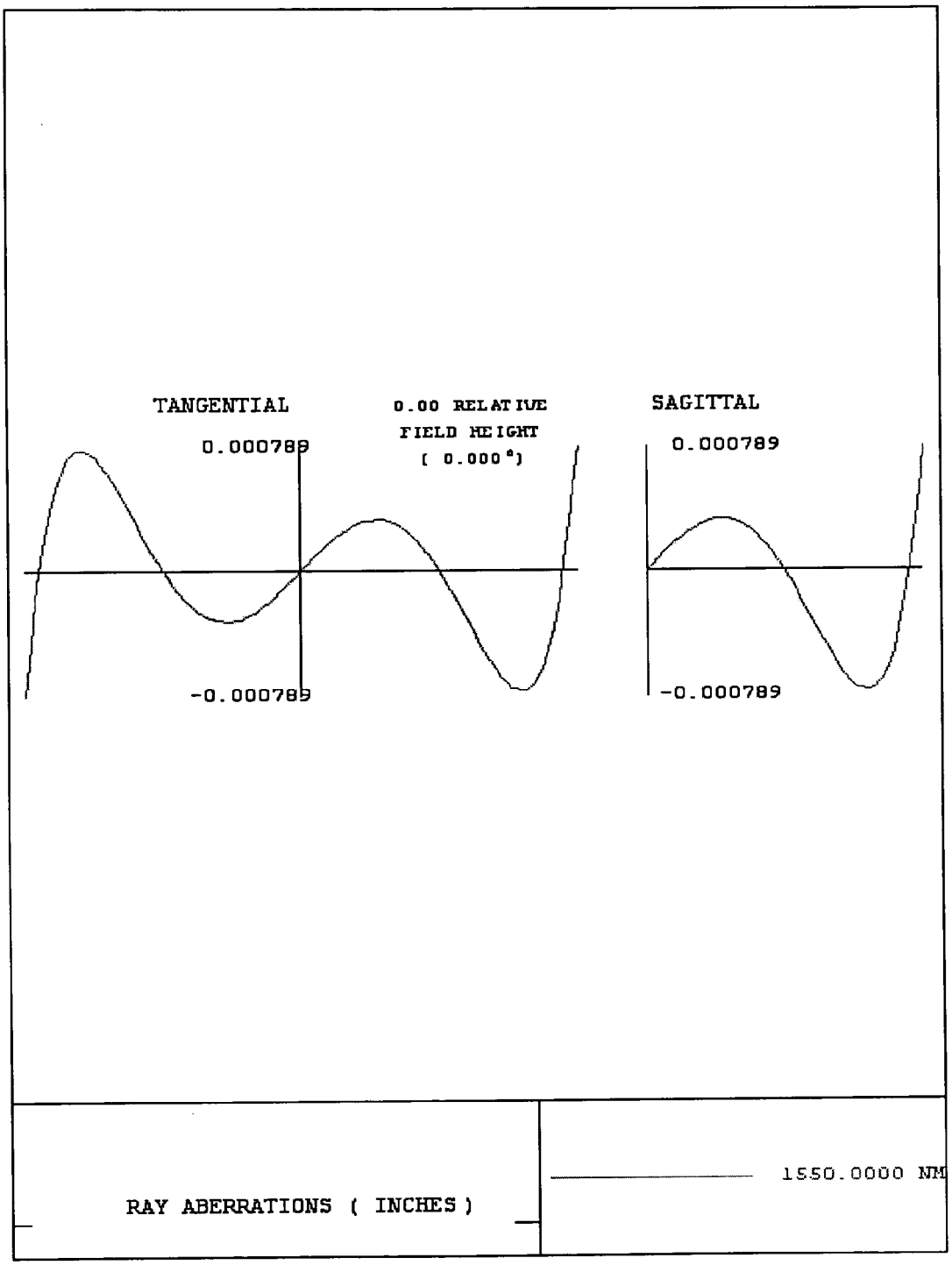
FIG. 8 is a graphical illustration of ray intercept curves of the lens collimator of the present invention.

FIG. 8 illustrates the lens ray intercept curves. This figure is a plot of the distance between a ray impact on the focal plane and the lens center axis as a function of the distance between the lens center axis and the position the ray was projected into the lens.

Figure 9:
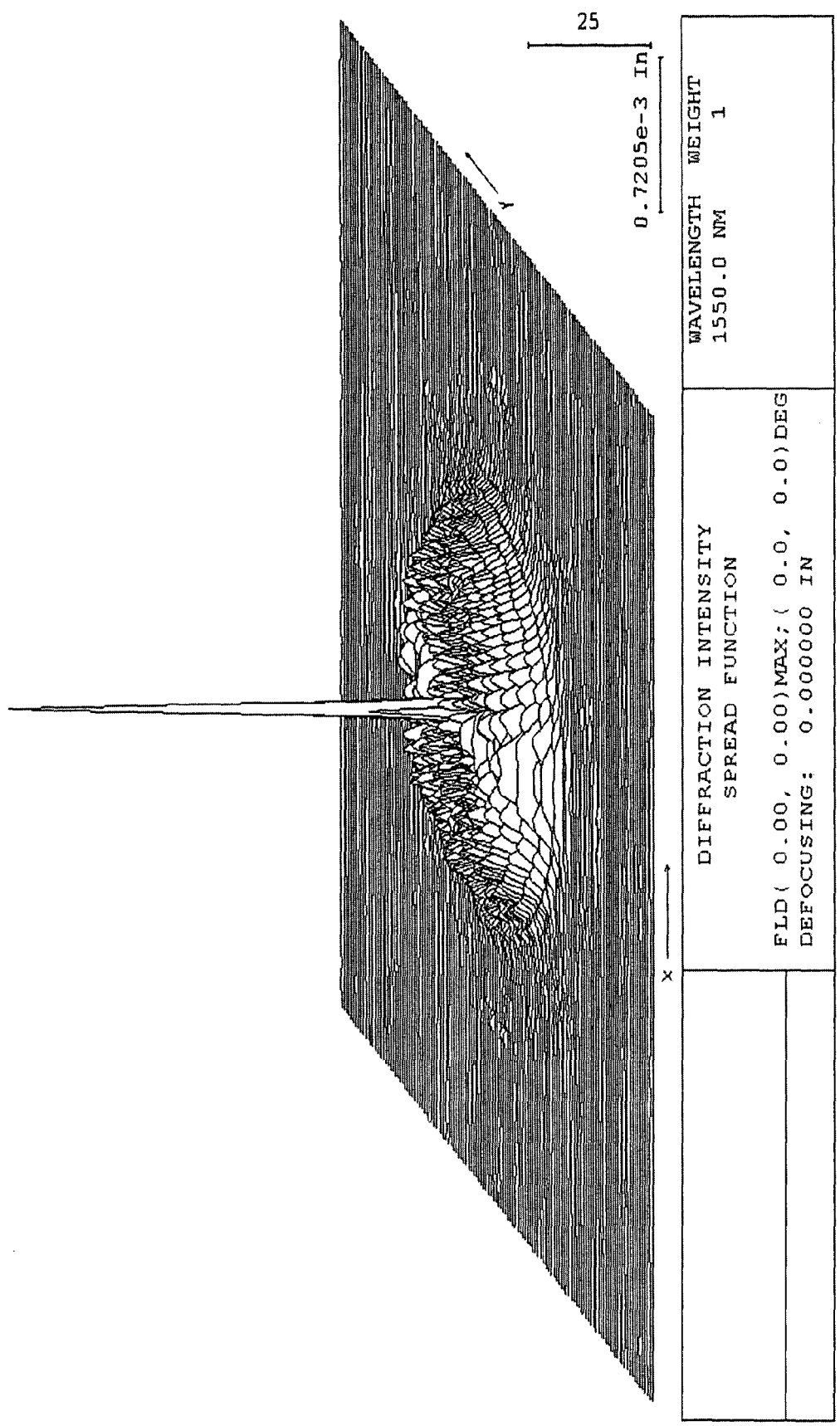
FIG. 9 is a graphical illustration of the diffraction point spread function of the lens collimator of the present invention.

FIG. 9 illustrates a diffraction point spread function. This figure is similar to FIG. 7, except that diffraction is included with no intercept points. The figure basically illustrates intensity in the focal plane.

It will be appreciated that the embodiments described above and illustrated in the drawings represent only a few of the many ways of implementing a lens collimator and method of producing optical signals with reduced aberrations.

The lens may be of any shape, size, f-number or thickness and may be constructed of any suitable materials. The lens may include any quantity of lens elements arranged in any desired fashion to produce an optical path with any quantity of folds, reflections and/or refractions. Each lens element may be of any shape, size, thickness and curvature and may be constructed of any suitable materials, while the lens elements may be arranged in any fashion relative to each other (e.g., concentric, eccentric, overlap in any desired fashion, etc.). The lens elements may each be implemented by any type of lens (e.g., spherical, etc.) and include any quantity of any types or combinations of surfaces (e.g., spherical, flat, curved, etc.). The lens elements may each include any conventional or other type of coating to enhance durability or control reflection or refraction of optical signals. The coatings may be implemented by any conventional or other coatings (e.g., include any quantity of oxides, etc.). The lens elements may be bonded together via any conventional or other adhesive (e.g., optical cement, glue, etc.), where the adhesive may have any degree of transparency, or may be optically contacted with no adhesive used.

The lens optical path may include any quantity of reflections, refractions, folds or surfaces to reduce adverse effects (e.g., aberrations). Any characteristics of any quantity of path surfaces may be variable or dependent upon any characteristics of any quantity of other path surfaces. The path surfaces may correspond to any real or virtual surfaces of the lens unit or lens elements. The optical signals may be reflected and/or refracted in any directions within the lens optical path. The optical signals may enter and/or exit the lens at any desired locations. The values in the lens prescription may be modified in any fashion enabling the lens to function in accordance with the principles of the present invention. The lens may be employed with any desired optical signals (e.g., light, laser, etc.) including any desired characteristics (e.g., color, frequency, wavelength, intensity, etc.). The lens may be used with any type of conventional or other optical signal carrier (e.g., fiber, etc.). Any quantity of lenses may be employed and arranged in any fashion (e.g., in tandem, parallel, etc.) to produce optical signals for a particular application. Further, the lens of the present invention may be configured to arrange optical signals or beams in any desired format (e.g., collimated, narrow, dispersed, diffracted, refracted, etc.).

It is to be understood that the terms "top", "bottom", "front", "rear", "side", "length", "thickness", "width", "height" and the like are used herein merely to describe points of reference and do not limit the present invention to any particular configuration or orientation. The present invention is not limited to the applications disclosed herein, but may be utilized for any application requiring collimating or focusing of optical signals (e.g., optical communications, rangefinder test equipment, fine tracking assembly, etc.).

From the foregoing description, it will be appreciated that the invention makes available a novel lens collimator and method of producing optical signals with reduced aberrations, wherein a lens collimator includes a plurality of lens elements that provide an increased quantity of surfaces for optical signal reflections to occur within the lens optical path, thereby enabling the lens collimator to cancel out adverse effects (e.g., aberrations, etc.) from the resulting optical signals or beam.

Having described preferred embodiments of a new and improved lens collimator and method of producing optical signals with reduced aberrations, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An optical lens unit for an optical communications unit of an optical communications system to produce resulting optical communication signals with enhanced properties comprising:

a plurality of lens elements arranged to direct incoming optical communication signals, received by said optical communications unit and into said optical lens unit via one of said lens elements, in a folded optical path through said lens elements in a first direction from a first end of said folded optical path to a second end of said folded optical path to produce a resulting communication reception beam, and to direct outgoing optical communication signals, for external transmission by said optical communications unit from said one lens element to another unit in said optical communications system, through said folded optical path in a second opposite direction from said second end to said first end to produce a resulting communication transmission beam, wherein said optical path includes a plurality of reflections and refractions of said optical communication signals from surfaces of said lens elements to reduce adverse properties of said resulting communication beams.

2. The unit of claim 1, wherein said plurality of lens elements includes a focal lens element positioned proximate a focal plane of said optical lens unit, a stop lens element attached to said focal lens element to limit an aperture of said optical lens unit and a reflective lens element attached to said stop lens element to reflect and refract said optical communication signals to maintain said optical communication signals along said folded optical path.

3. The unit of claim 2, wherein said focal, stop and reflective lens elements are arranged in a concentric fashion relative to each other.

4. The unit of claim 2, wherein said stop lens element includes a rim disposed adjacent a stop lens element periphery and outside the confines of said reflective lens element to transfer optical communication signals between said optical lens unit and a surrounding environment.

5. The unit of claim 1, wherein said lens elements are arranged to direct a narrow optical signal beam from a unit focal plane through said optical path in said second direction to produce a resulting collimated beam as said communication transmission beam.

6. The unit of claim 1, wherein said lens elements are arranged to direct an incoming collimated optical signal beam through said optical path in said first direction to produce a resulting narrow beam as said communication reception beam proximate a unit focal plane.

7. The unit of claim 1, wherein said plurality of lens elements are arranged to control beam intercept angles relative to an image plane to match performance of an optical signal carrier coupled to said optical lens unit.

8. The unit of claim 1, wherein said optical lens unit includes an f-number of approximately 1.0.

9. The unit of claim 1, wherein said optical lens unit includes a thickness of approximately 2.5 inches and a diameter of approximately six inches.

10. The unit of claim 1, wherein properties of at least one of said surfaces within said optical path is directly dependent upon another surface within said optical path.

11. The unit of claim 1, wherein said adverse properties of said resulting communication beams include aberrations.

12. The unit of claim 1, wherein each of said lens elements includes at least one spherical surface.

13. A method of producing optical communication signals with enhanced properties in an optical communications unit of an optical communications system via an optical lens unit including a plurality of lens elements, wherein said optical communications unit includes at least one of a receive mode and a transmit mode, and said method comprises:
(a) directing incoming optical communication signals, received by said optical communications unit and into said optical lens unit via one of said lens elements, in a folded optical path through said optical lens unit in a first direction from a first end of said folded optical path to a second end of said folded optical path to produce a resulting communication reception beam in response to said optical communications unit including and operating in said receive mode; and
(b) directing outgoing optical communication signals, for external transmission by said optical communications unit from said one lens element to another unit in said optical communications system, through said folded optical path in a second opposite direction from said second end to said first end to produce a resulting communication transmission beam in response to said optical communications unit including and operating in said transmit mode, wherein said optical path includes a plurality of reflections and refractions of said optical communication signals from surfaces of a plurality of lens elements to reduce adverse properties of said resulting communication beams.

14. The method of claim 13, wherein said plurality of lens elements includes a focal lens element positioned proximate a focal plane of said optical lens unit, a stop lens element attached to said focal lens element to limit an aperture of said optical lens unit and a reflective lens element attached to said stop lens element to reflect and refract said optical communication signals to maintain said optical communication signals along said folded optical path, and step (a) further includes:
(a.1) arranging said focal, stop and reflective lens elements in a concentric fashion relative to each other.

15. The method of claim 13, wherein said plurality of lens elements includes a focal lens element positioned proximate a focal plane of said optical lens unit, a stop lens element attached to said focal lens element to limit an aperture of said optical lens unit and a reflective lens element attached to said stop lens element to reflect and refract said optical communication signals to maintain said optical communication signals along said folded optical path, and wherein said stop lens element includes a rim disposed adjacent a stop lens element periphery and outside the confines of said reflective lens element, and step (b) further includes:
(b.1) transferring said incoming and outgoing optical communication signals between said optical lens unit and a surrounding environment via said rim.

16. The method of claim 13, wherein step (b) further includes:
(b.1) directing a narrow optical signal beam from a unit focal plane through said optical path in said second direction to produce a resulting collimated beam as said communication transmission beam.

17. The method of claim 13, wherein step (a) further includes:
(a.1) directing an incoming collimated optical signal through said optical path in said first direction to produce a resulting narrow beam as said communication reception beam proximate a unit focal plane.

18. The method of claim 13, wherein
said plurality of lens elements are arranged to control beam intercept angles relative to an image plane to match performance of an optical signal carrier coupled to said optical lens unit.

19. The method of claim 13, wherein said optical lens unit includes an f-number of approximately 1.0.

20. The method of claim 13, wherein said optical lens unit includes a thickness of approximately 2.5 inches and a diameter of approximately six inches.

21. The method of claim 13, wherein properties of at least one of said surfaces within said optical path is directly dependent upon another surface within said optical path.

22. The method of claim 13, wherein said adverse properties of said resulting communication beams include aberrations.

23. The method of claim 13, wherein each of said lens elements includes at least one spherical surface.

* * * * *